(12) United States Patent
Ma

(10) Patent No.: US 11,952,197 B2
(45) Date of Patent: Apr. 9, 2024

(54) THERMAL LIQUID CONTAINER SYSTEM

(71) Applicant: Hongbin Ma, Columbia, MO (US)

(72) Inventor: Hongbin Ma, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 909 days.

(21) Appl. No.: 16/993,317

(22) Filed: Aug. 14, 2020

(65) Prior Publication Data

US 2021/0078789 A1 Mar. 18, 2021

Related U.S. Application Data

(60) Provisional application No. 62/900,205, filed on Sep. 13, 2019.

(51) Int. Cl.
| | |
|---|---|
| *A47J 41/00* | (2006.01) |
| *A47J 31/00* | (2006.01) |
| *A47J 31/50* | (2006.01) |
| *B65D 81/18* | (2006.01) |
| *B65D 81/38* | (2006.01) |
| *B65D 85/72* | (2006.01) |
| *F28D 21/00* | (2006.01) |

(52) U.S. Cl.
CPC ........ *B65D 81/3823* (2013.01); *A47J 31/005* (2013.01); *A47J 31/50* (2013.01); *A47J 41/0044* (2013.01); *B65D 81/18* (2013.01); *B65D 85/72* (2013.01); *F28D 21/00* (2013.01); *F28D 2021/0019* (2013.01)

(58) Field of Classification Search
CPC .... B65D 81/3823; B65D 81/18; A47J 31/005; A47J 31/50; A47J 41/0044; F28D 85/00; F28D 2021/0019

USPC ........................................................ 99/323
See application file for complete search history.

(56) References Cited

U.S. PATENT DOCUMENTS

| | | | |
|---|---|---|---|
| 2,876,634 A | 3/1959 | Zimmerman et al. | |
| 3,205,677 A | 9/1965 | Stoner | |
| 3,603,106 A | 9/1971 | Ryan | |
| 3,807,194 A * | 4/1974 | Bond | F25D 3/06 62/438 |

(Continued)

OTHER PUBLICATIONS

U.S. Letters Patent No. 83,755 dated November 3, 1868 by Sterling Bass.

*Primary Examiner* — Omar Flores Sanchez
(74) *Attorney, Agent, or Firm* — Sandberg Phoenix & von Gontard, P.C.

(57) ABSTRACT

A thermal liquid container system comprising a main body, a phase change material (PCM) liner disposed within the main body having a PCM disposed therein, a liquid reservoir defined by PCM liner, a liquid dispensing partition disposed within the liquid reservoir such that the liquid reservoir is partitioned into a temperature conditioning channel and a liquid retention chamber, and a lid comprising a liquid ingress and a liquid dispensing opening, the temperature conditioning channel for placing a liquid passing therethrough in thermal contact with the PCM whereby thermal energy is exchanged between the liquid flowing through the temperature conditioning channel and the PCM such that the liquid is dispensed at a temperature that is within a desired temperature range determined by the selected PCM melting temperature.

18 Claims, 10 Drawing Sheets

(56) References Cited

U.S. PATENT DOCUMENTS

| | | | | |
|---|---|---|---|---|
| 3,995,445 | A * | 12/1976 | Huskins | F25D 3/00 62/530 |
| 4,638,645 | A * | 1/1987 | Simila | F25D 31/007 62/529 |
| 6,634,417 | B1 * | 10/2003 | Kolowich | A47G 19/2288 165/902 |
| 6,821,539 | B2 * | 11/2004 | Lassota | A47J 31/50 426/520 |
| 7,934,537 | B2 | 5/2011 | Kolowich | |
| 2004/0255787 | A1 * | 12/2004 | Lassota | F24V 30/00 99/275 |
| 2011/0248038 | A1 * | 10/2011 | Mayer | F25D 3/06 220/592.2 |
| 2018/0171197 | A1 * | 6/2018 | Ma | B65D 51/24 |
| 2020/0008623 | A1 * | 1/2020 | Ma | B65D 47/04 |
| 2021/0137313 | A1 * | 5/2021 | Ma | A47J 36/2494 |
| 2021/0235933 | A1 * | 8/2021 | Ma | B65D 81/3823 |

* cited by examiner

THERMAL LIQUID CONTAINER SYSTEM

CROSS REFERENCES

This application claims the benefit of U.S. Provisional Application No. 62/900,205, filed on Sep. 13, 2019. The disclosure of the above application is incorporated herein by reference in its entirety.

FIELD

The present teachings relate to a thermal liquid container system, and more particularly to a liquid container system that can have liquids of an undesired temperature poured into the container and substantially immediately have the liquid dispensed from the container at a desired temperature.

BACKGROUND

The statements in this section merely provide background information related to the present disclosure and may not constitute prior art.

There are many thermal insulating liquid containers (e.g., beverage containers) on the market today. Such containers are typically structured and operable to minimize (i.e., slow down) the rejection and/or absorption of heat from the liquid (e.g., beverage) disposed within the container into or by the ambient environment. That is, such containers are structured and operable to slow down the cooling and/or warming of the liquid (e.g., beverage) by providing an insulating barrier between the hot or cold liquid and the ambient environment such that the rejection of the thermal energy within the liquid to the ambient environment, and/or the absorption of the thermal energy within liquid by the ambient environment is minimized. Such thermal insulating liquid (e.g., beverage) containers are relatively thermally inefficient and do not maintain the liquid (e.g., beverage) at a desirable drinking temperature for an extended period of time. For example, for hot beverages the desired drinking temperature can be approximately 98° F. to 160° F. (approximately 37° C. to 71° C.), and for cold beverages the desired drinking temperature can be approximately 32° F. to 50° F. (approximately 0° C. to 10° C.).

Such known thermal insulating liquid (e.g., beverage) containers are generally known to maintain the respective liquid beverage within the desired temperature range (e.g., desired drinking temperature range) only for a short period of time. For example, if a hot beverage is poured into a paper cup without any insulation, the temperature of the beverage may remain within the desired drinking temperature range for only approximately 5-30 minutes. Or, for example, if a hot liquid is poured into a known insulated beverage container, e.g., a double-walled vacuum tumbler, the beverage may remain the desired drinking temperature range for only approximately 30-90 minutes.

Various related technology patents are US patents: U.S. Pat. Nos. 2,876,634; 3,205,677; 3,603,106; 3,807,194; 3,995,445; 4,638,645; 6,634,417; 7,934,537; and US0083755. However, the manufacturing process disclosed in such patents has limited application.

SUMMARY

The present disclosure generally provides a thermal liquid container system for dispensing a liquid from the system at a temperature within a desired temperature range. In various embodiments, the system comprises a main body and a phase change material (PCM) liner disposed within the main body. A PCM having a selected melting temperature is disposed within the PCM liner. The system additionally comprises a liquid reservoir defined by PCM liner, wherein the liquid reservoir is structured and operable to have a liquid disposed therein having a first temperature. The system further comprises a liquid dispensing partition disposed within the liquid reservoir. The liquid dispensing partition partitions the liquid reservoir into a temperature conditioning channel formed between the PCM liner and the beverage dispensing partition, and a liquid retention chamber defined by the liquid dispensing partition. The system still further comprises a lid having a liquid ingress opening formed within a central body of the lid and a liquid dispensing opening formed within a lip of the lid. The lid is connectable to the main body and/or the PCM liner such that a seal is formed between the central body and a proximal end of the PCM liner. The seal provides a barrier between the central body and a proximal end of the PCM liner such that in order for a liquid within the liquid reservoir to be dispensed through the liquid dispensing opening, the liquid must flow through the temperature conditioning channel. As the liquid flows through the conditioning channel the temperature conditioning channel places the liquid in thermal contact with the PCM whereby thermal energy is exchanged between the liquid flowing through the temperature conditioning channel and the PCM. Thereafter, the liquid is dispensed through the liquid dispensing opening at a second temperature that is within a desired temperature range determined by the selected PCM melting temperature.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 1 is a block diagram exemplarily illustrating a thermal liquid container system, in accordance with various embodiments of the present disclosure FIG. 2A is a block diagram of the thermal liquid container system shown in FIG. 1 exemplarily illustrating a liquid being dispensed when a liquid reservoir of the container is filled with the liquid, in accordance with various embodiments of the present disclosure.

Figure 1:
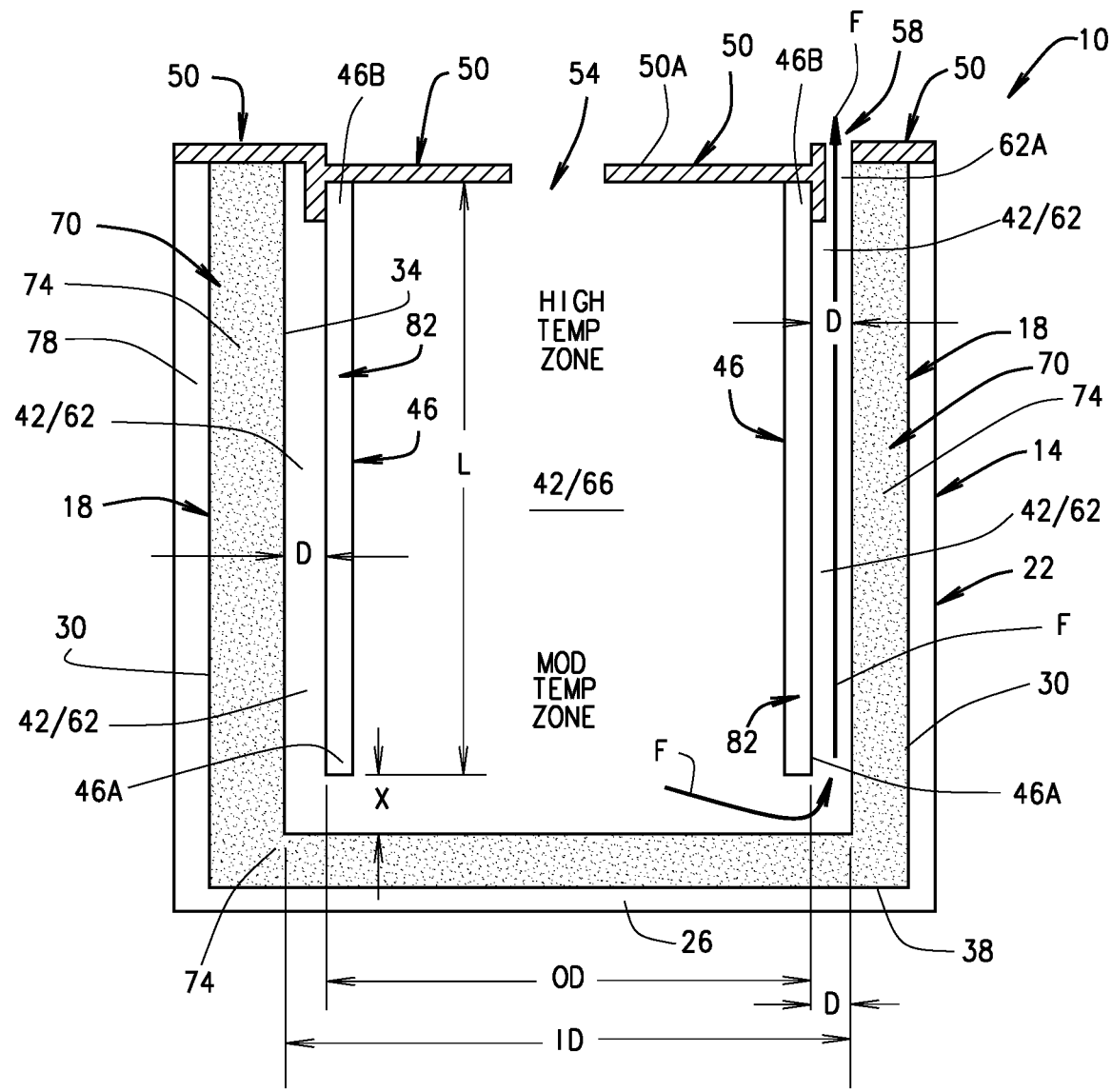
Figure 3:
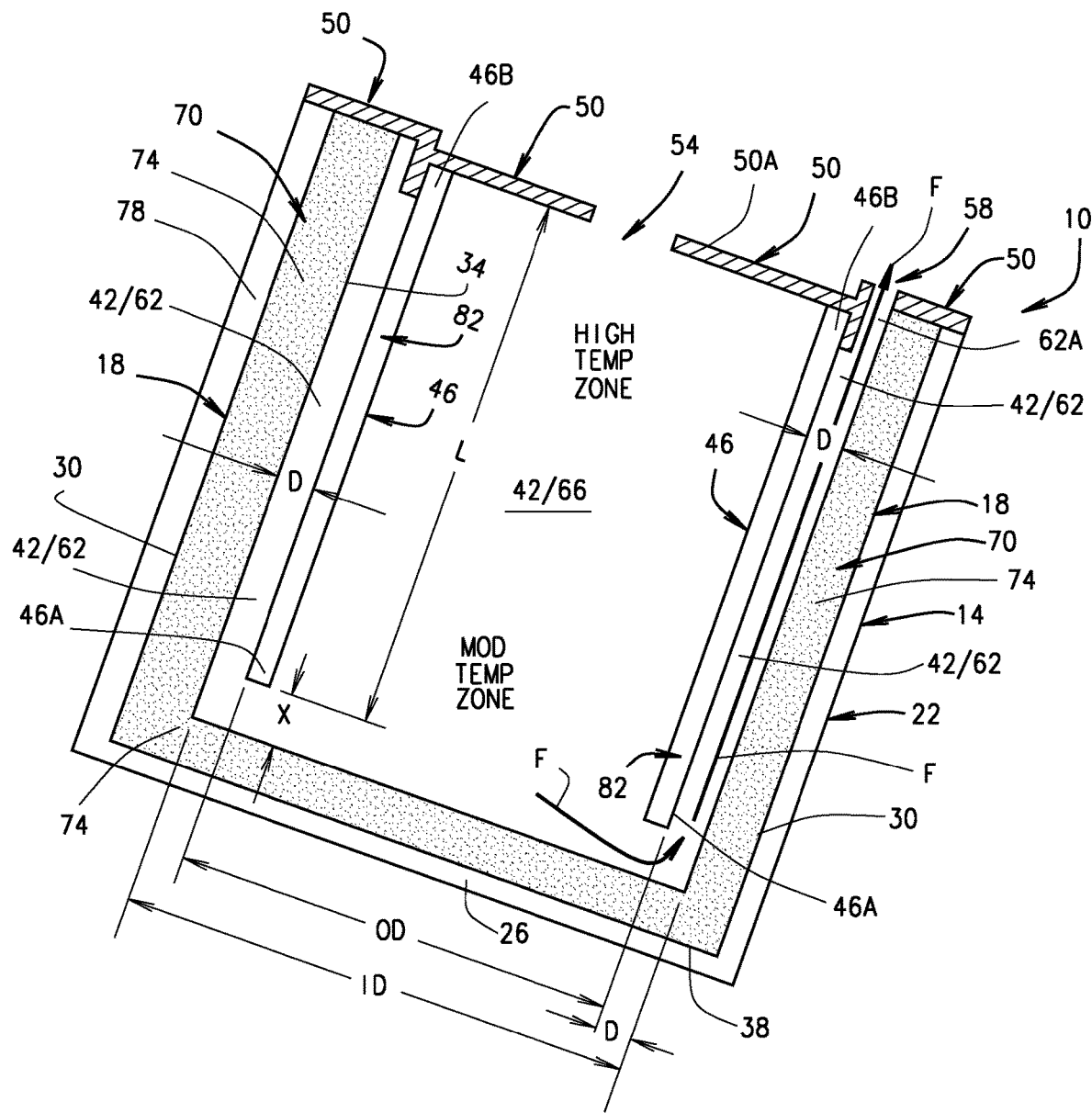
Figure 4:
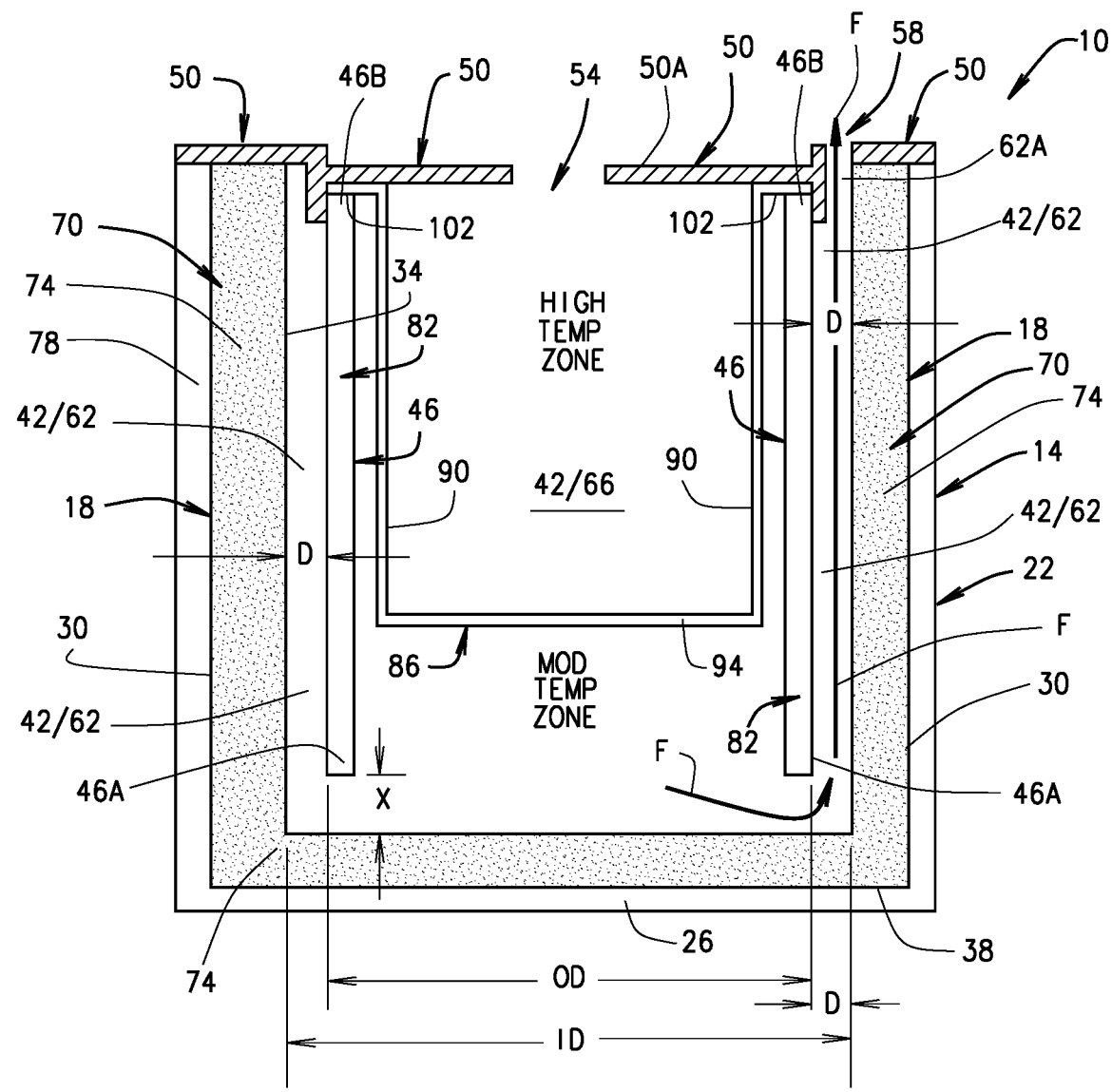

FIG. 3 is a block diagram of the thermal liquid container system shown in FIG. 1 exemplarily illustrating a dispensing liquid flow path when the container system is tilted, in accordance with various embodiments of the present disclosure FIG. 4 is a block diagram of the thermal liquid container system shown in FIG. 1 including a steeping basket, in accordance with various embodiments of the present disclosure.

Figure 5A:
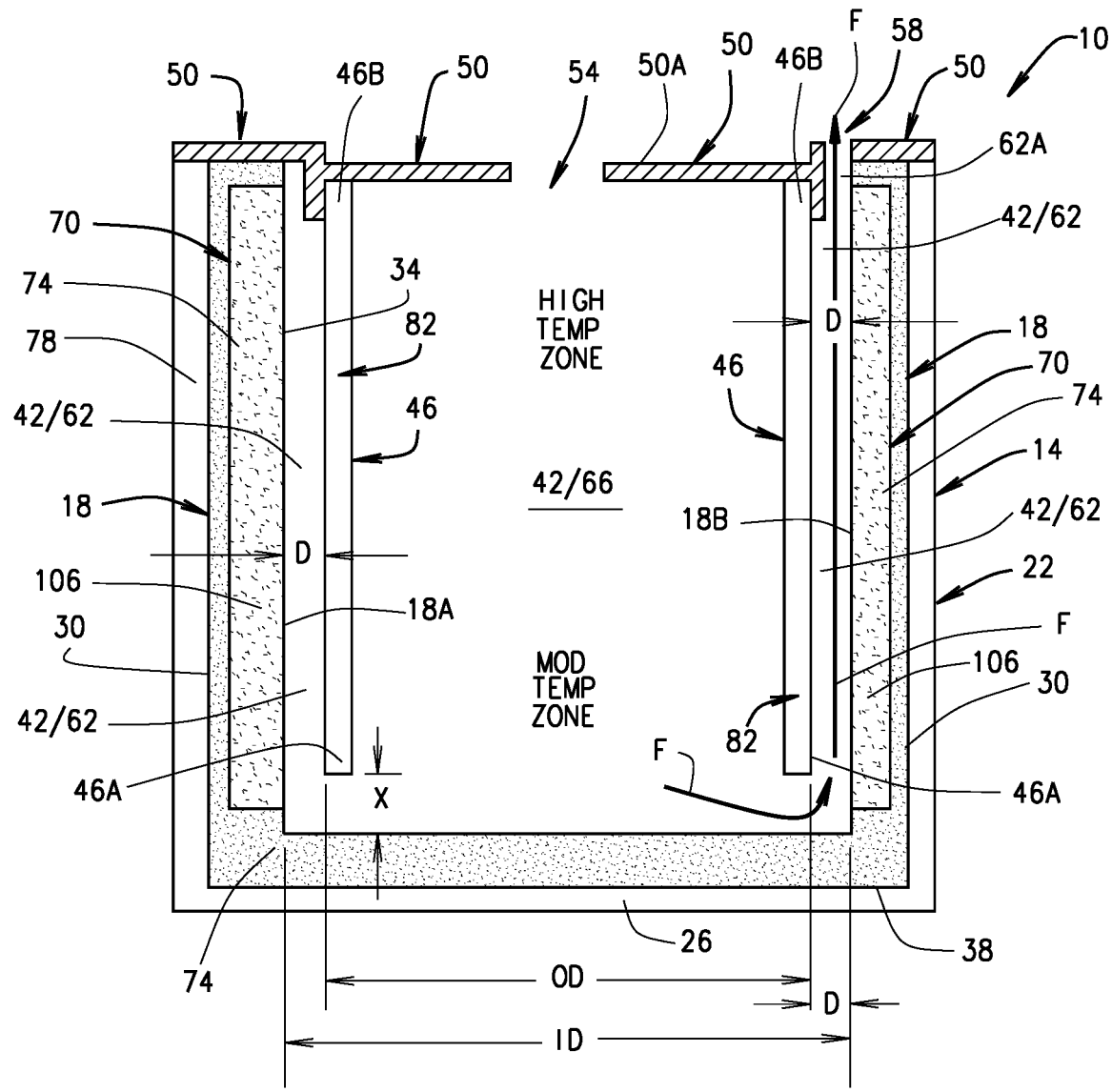

FIG. 5A is a block diagram of the thermal liquid container system shown in FIG. 1 including one or more PMC heat sink, in accordance with various embodiments of the present disclosure.

Figure 5B:
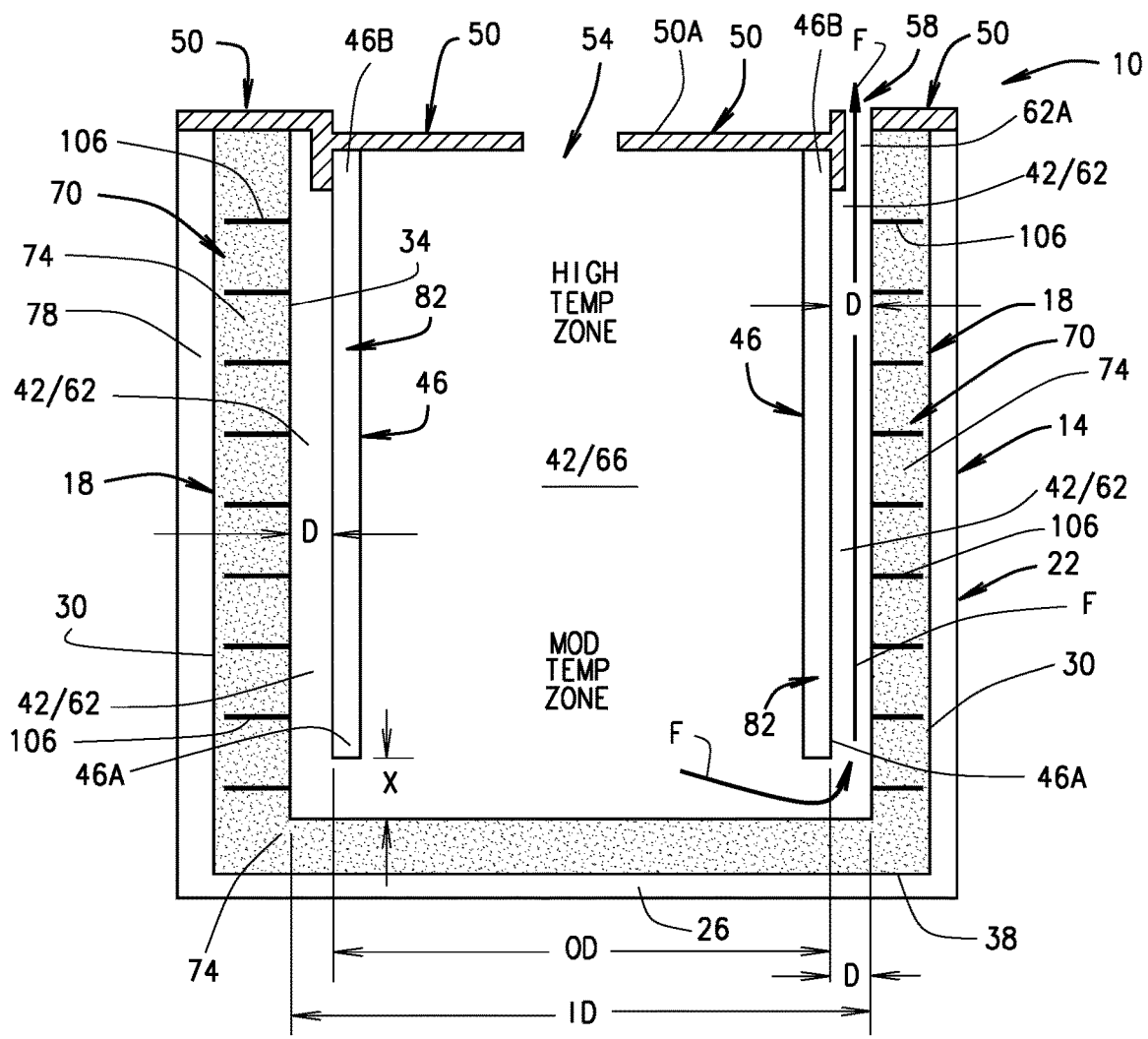

FIG. 5B is a block diagram of the thermal liquid container system shown in FIG. 1 including one or more PMC heat sink, in accordance with various other embodiments of the present disclosure.

Figure 5C:
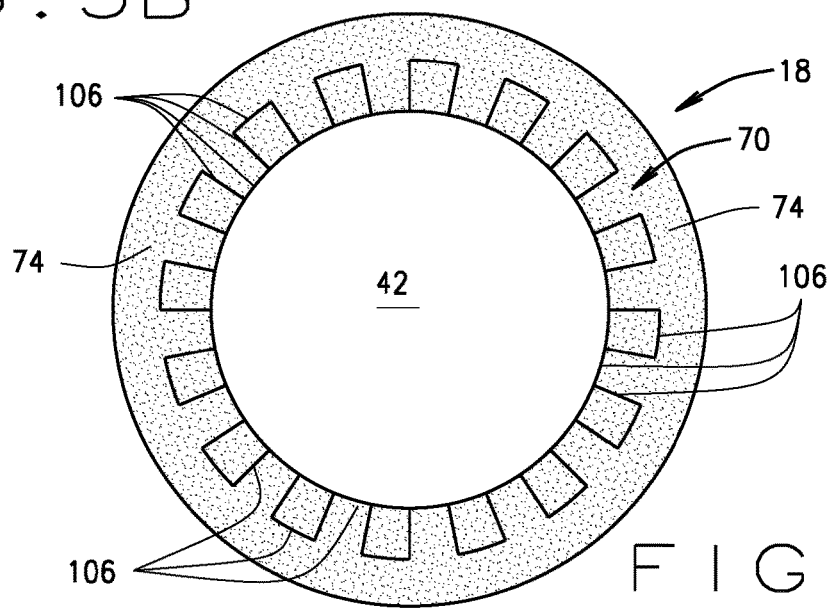

FIG. 5C is a lateral cross-sectional view of a PCM liner of the thermal liquid container system shown in FIG. 1 including one or more PMC heat sink, in accordance with various other embodiments of the present disclosure.

Figure 6:
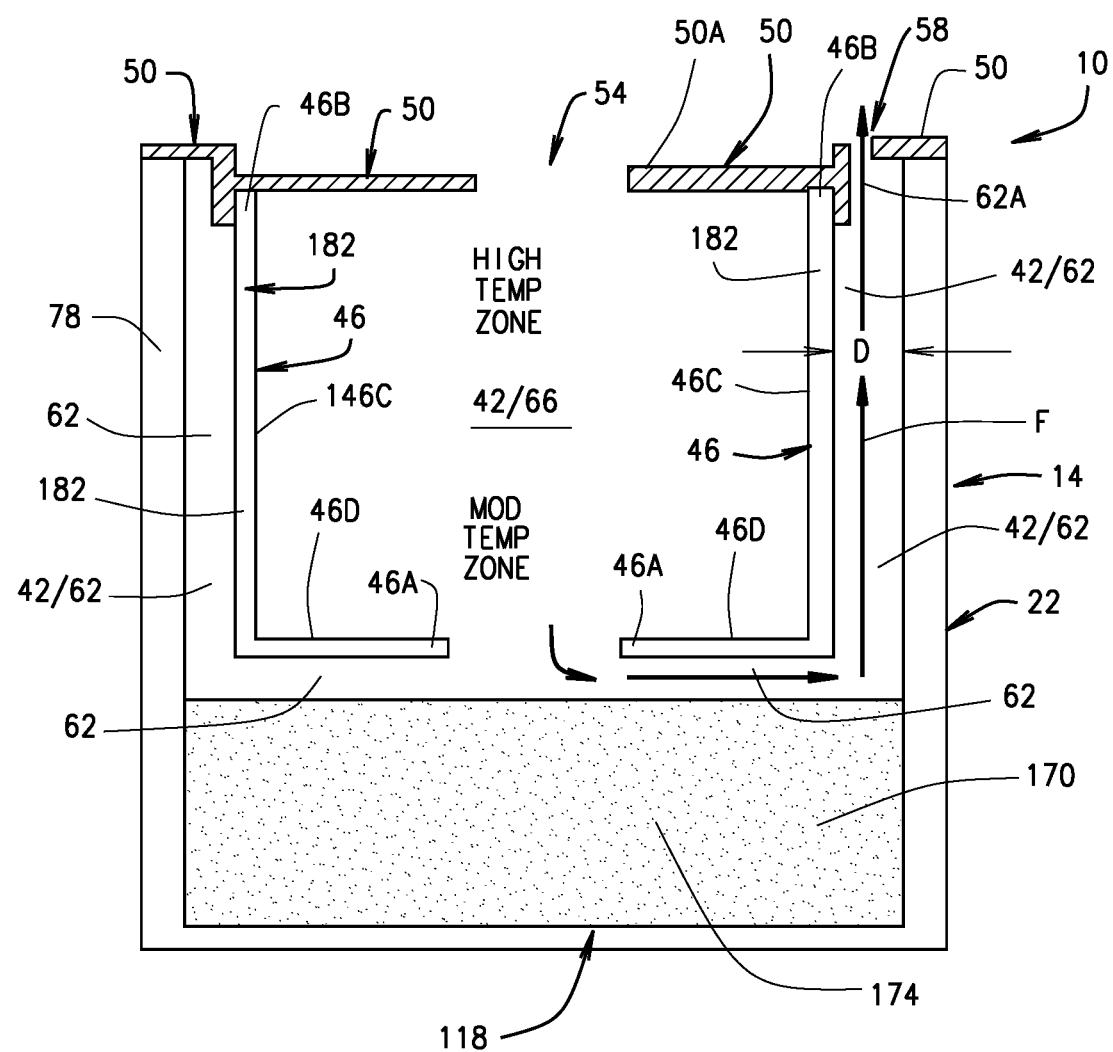

FIG. 6 is a block diagram of the thermal liquid container system in accordance with FIG. 1 including an 'L' shaped beverage dispensing partition, in accordance with various embodiments of the present disclosure.

Figure 7:
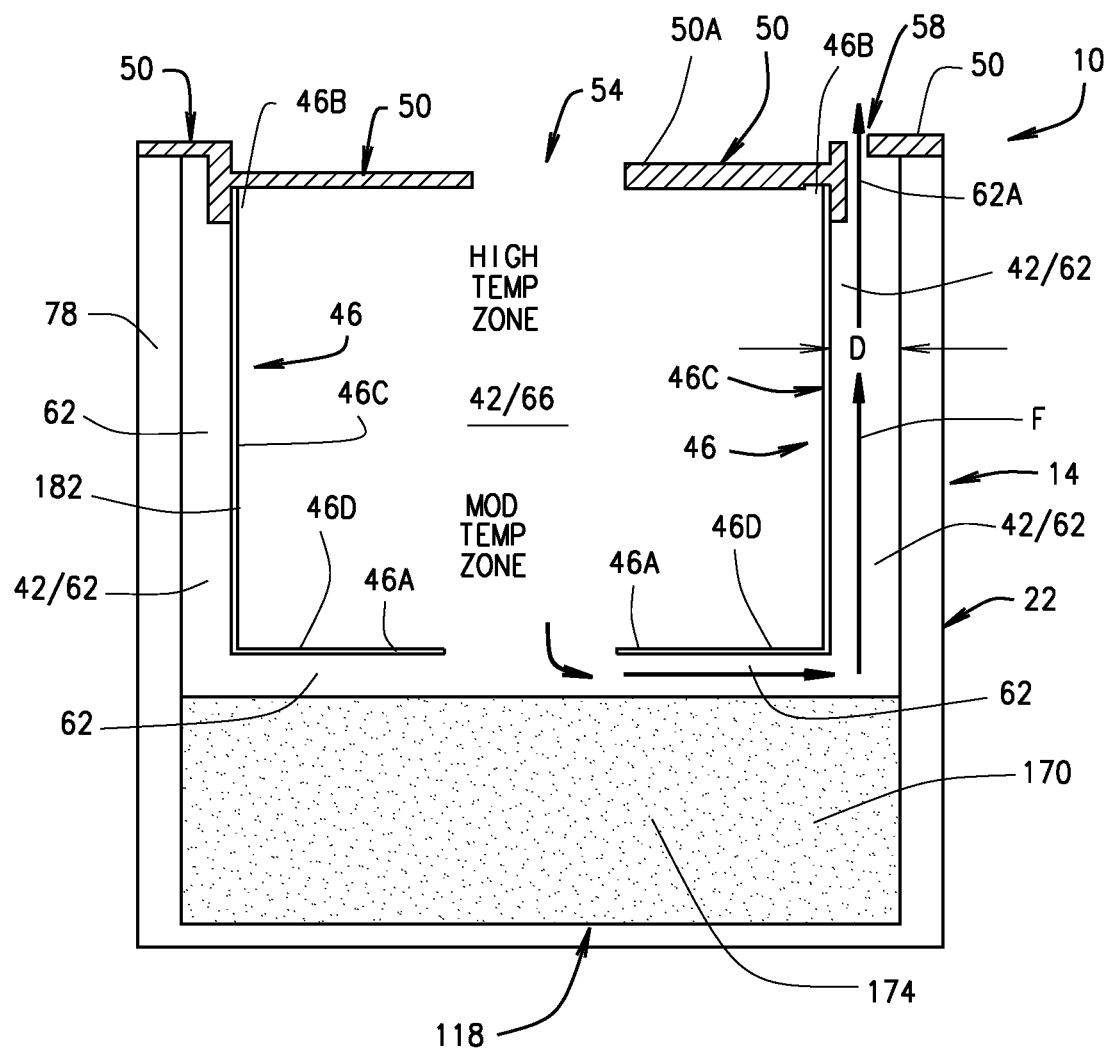

FIG. 7 is a block diagram of the thermal liquid container system shown in FIG. 6, in accordance with various other embodiments of the present disclosure.

Corresponding reference numerals indicate corresponding parts throughout the several views of drawings.

DETAILED DESCRIPTION

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and can include simplified conceptual views to facilitate understanding or explanation. As well, the relative size and arrangement of the components can differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" can be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there can be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms can be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components can be oriented differently, for instance, during transportation and manufacturing as well as operation. Because many varying and different embodiments can be made within the scope of the concept(s) herein taught, and because many modifications can be made in the embodiments described herein, it is to be understood that the details herein are to be interpreted as illustrative and non-limiting.

As used herein, it will be understood that generally a phase change material (PCM) is a substance with a high heat of fusion that melts and solidifies at a certain temperature and is capable of storing and releasing large amounts of energy. Heat is absorbed or released when the PCM changes from solid to liquid and vice versa, thus, PCMs are often classified as latent heat storage (LHS) units. When PCMs reach the temperature at which they change phase (their melting temperature) they absorb large amounts of heat at an almost constant temperature. The PCM continues to absorb heat without a significant rise in temperature until all the material is transformed to the liquid phase. When the temperature of the environment surrounding the liquid PCM falls to below the PCM melting temperature, the PCM solidifies, releasing its stored latent heat into the surrounding environment. A large number of PCMs are available in any required temperature range, e.g., from approximately 20° F. to 375° F. (approximately from −7° C. up to 190° C.). Many PCMs can store 5 to 14 times more heat per unit volume than sensible heat of conventional storage materials such as water, masonry or rock.

The present teachings relate to a thermal liquid container, and more particularly to a liquid container that can have liquids of an undesired temperature poured into the container and substantially immediately have the liquid dispensed from the container at a desired temperature.

Referring now to FIGS. 1 through 3, the present disclosure provides a thermal liquid container system 10 (e.g., a consumable beverage container or mug) that is structured and operable to quickly condition or adjust (e.g., change) a temperature of a liquid poured into the container system 10 to be within a desired temperature range when the liquid is discharged or dispensed, and further to dispense the liquid within the desired temperature range for an extended period of time (e.g., 1-24 hours). That is, the container system 10 is structured and operable to receive a liquid (i.e., have liquid poured into the container system 10) having an undesired temperature and substantially immediately dispense the liquid at a temperature within a desired temperature range. Additionally, the container system 10 is structured and operable to retain the received liquid at substantially the undesired temperature for an extended long of time (e.g., 1 to 12 hours) and dispense the liquid a temperature within the desired temperature range for an extended period of time (e.g., 1-24 hours). Accordingly, the liquid can be poured into the container system 10 at an undesired temperature and be dispensed at a temperature within the desired temperature range substantially immediately thereafter and for an extended period of time (e.g., 1 to 24 hours) thereafter. It should be understood that although the container system 10 of the present disclosure can be any container system used to quickly adjust the temperature of any liquid as the liquid is being dispensed, and remain within the scope of the present disclosure, for simplicity and clarity the container system 10 will be illustrated and described herein as a beverage container system 10 used to quickly adjust the temperature of a liquid beverage to be within a desired drinking temperature range as the beverage is being dispensed, and be capable of doing so for an extended period of time (e.g., for approximately 1 to 24 hours). In such embodiments, example desired drinking temperature ranges can be approximately 37° C./98° F. to 71° C./160° F. for hot beverages, and approximately 0° C./32° F. to or to 12° C./54° F. for cold beverages.

Generally, the container system 10 comprises a main body 14 and a phase change material (PCM) liner 18 disposed (e.g., fixedly or removably) within the main body 14. More specifically, the main body 14 is structured and formed to have at least one sidewall 22 and a bottom 26 that define a PCM liner receptacle 30 in which the PCM liner 18 is structured and formed to be disposed. The PCM liner 18 is a hollow body liner having at least one sidewall 34, and in various instances a bottom 38, that define a liquid or beverage reservoir 42 suitable for retaining various hot and/or cold liquids and beverages (e.g., coffee, tea, hot chocolate, soda, beer, water, etc.). The main body sidewall 22 and the PCM liner sidewall 34 can be structured and formed to have generally any radial (or lateral) cross-sectional shape and to define the beverage reservoir 42 having generally any lateral cross-sectional shape. For example, in various embodiments, the main body and PCM liner 18 sidewalls 22 and 34 can be structured and formed to have a cylindrical, square, oval, rectangular, triangular, etc., radial (or lateral) cross-sectional shape, and the beverage reservoir 42 can have any similar or dissimilar cylindrical, square, oval, rectangular, triangular, etc., radial (or lateral) cross-sectional shape. In various instances the PCM liner 18 can be fixedly connected to the main body 14 and disposed within the PCM liner receptacle 30. In various alternative instances, the PCM liner 18 can be a removable module removably disposed within the PCM liner receptacle 30.

The container system 10 further comprises a lid or cap assembly 50 that is disposable over the open end of the system 10 and is removably connectable to a top end of the main body 14 and/or the PCM liner 18, and at least partially covers the beverage reservoir 42. The lid 50 includes a beverage ingress opening 54 formed in a central body 50A of the lid 50 that allows a beverage (or liquid) to be poured into the beverage reservoir 42, and a beverage dispensing opening 58 formed in a lip or rim of the lid 50 that allows a beverage to be dispensed from the beverage reservoir 42, as described further below. Still further, the container system 10 comprises an interior beverage dispensing partition 46 that is disposed, or is removably disposable, within the beverage reservoir 42. The partition 46 has a predetermined length L such that when the partition 46 is disposed within the beverage reservoir 42 it does not contact the PCM bottom wall 38 and has a predetermined space X between a distal end 46A of the partition 46 and the PCM bottom wall 38. The partition 46 is additionally has an outer diameter OD of a predetermined length such that when the partition 46 is disposed within the beverage reservoir 42 it is spaced a distance D from the PCM liner sidewall 34, thereby defining a beverage (or liquid) temperature conditioning channel 62 having the predetermined width of D.

In various embodiments, the lid 50 can be structured and operable to removably engage with the container body 14 and/or the PCM liner 18 in a substantially liquid-tight manner. For example, in various embodiments, the lid 50 can threadably and positively engage the body 14 and/or the PCM liner 18. Or, in other embodiments, the lid assembly 50 can comprise a seal or gasket, e.g., a rubber-like O-ring or any other type of liquid seal (not shown) disposed around or connected to an inner or outer face of a retention collar such that lid is removably frictionally and/or compressively engageable with the body 14 and/or the PCM liner 18. Importantly, the lid 50 is structured such that when it is properly disposed on and secured to the main body 14 and/or the PCM liner 18 the central body 50A of the lid 50 and a proximal end 46B of the dispensing partition 46 form a seal therebetween such that the only flow path for the beverage to be dispensed through the beverage dispensing opening 58 is for the beverage to flow around the dispensing partition distal end 46A, through the conditioning channel 62 and out the dispensing opening 58 in the lid 50, as described in detail below. The dispensing partition 46 additionally partitions the beverage reservoir 42 into a main beverage retention chamber 66 defined by dispensing partition 46 and the conditioning channel 62 formed between the PCM liner 18 and the beverage dispensing partition 46.

The PCM liner 18 is a hollow body having a PCM cavity 70 that is structured to retain a desired PCM 74 that thermally contacts a beverage within the temperature conditioning channel 62 such that thermal energy is exchanged between the beverage and the PCM 74 as the beverage is dispensed a consumer, thereby dispensing the beverage at a temperature within a desired temperature range, as described below. It is envisioned that the PCM liner 18 can be any one or more reservoir, bladder, compartment, cavity, container, housing, or other hollow structure that can be at least partially filled with the PCM 74. Moreover, the PCM liner 18 is structured and formed to be airtight and leak-tight such that any beverage (or other liquid) that may be disposed within the main beverage retention chamber 66 and/or the conditioning channel 62 will not leak, migrate or otherwise enter the PCM cavity 70, and similarly such that the PCM 74 will not leak, migrate or otherwise enter the main beverage retention chamber 66 and/or the conditioning channel 62. The PCM liner 18 can be fabricated of any material suitable for retaining hot and/or cold beverages (or liquids), e.g., beverages (or liquids) ranging from approximately −7° C./20° F. to 94° C./200° F. For example, it is envisioned that the PCM liner 18 can be fabricated from stainless steel, glass, ceramics, suitable plastics, etc.

Generally, the container system 10 of the present disclosure is structured and operable such that when a person discharges or pours a beverage from the container system 10 (e.g., proceeds to consume the beverage), the beverage flows through the temperature conditioning channel 62, whereby heat is exchanged between the beverage and a phase change material 74, thereby very quickly reducing or increases the beverage temperature to a temperature within the desired drinking temperature range which is substantially equal to the melting temperature of the PCM 74. For example, in various embodiments, the container system 10 that is structured and operable to allow a person who desires to drink a hot liquid (e.g., a hot consumable beverage) within a desired drinking temperature range (e.g., approximately 53° C./127° F. 58° C./136° F.) to pour a hot beverage that has a temperature greater/higher than an upper limit of a desired drinking temperature range (e.g., greater/higher than 55° C./136° F.) into the beverage reservoir 42 of the system 10, whereafter the liquid can be consumed substantially instantly at a temperature within the desired drinking temperature range (e.g. 53° C./127° F. to 55° C./136° F.). More particularly, substantially immediately, or within a very short time (e.g., 1-30 seconds) after the hot beverage is poured into the beverage reservoir 42, the beverage can be discharged from the main beverage retention chamber 66 via the conditioning channel 62 whereby as the hot beverage flows through temperature conditioning channel 62 heat is extracted from beverage by a PCM 74 substantially instantly reducing the beverage temperature to a temperature substantially equal to the PCM melting temperature which is selected to be within the desired drinking temperature range.

More specifically, when a beverage (e.g., a hot beverage such as coffee), is poured into or disposed within the beverage reservoir 42, and then the beverage is dispensed through the conditioning channel 62, the thermal energy (i.e., the heat) from hot beverage is transferred (i.e., rejected to and absorbed by) the PCM 74, causing the PCM 74 to change phase from a substantially solid form to a liquid form, whereby the PCM 74 stores the thermal energy (i.e., the heat). Note the PCM 74 is preselected to have melting temperature that is within a desired drinking temperature range for the respective beverage. Therefore, when the hot beverage is poured into the beverage reservoir 42, and when the beverage is dispensed through the conditioning channel 62, the PCM absorbs thermal energy (e.g., heat) from the hot beverage, such that the temperature of the hot beverage is quickly reduced to, or approximate to, the respective melting temperature of the respective PCM 74 (i.e., within the desired drinking temperature range). Thereafter, when the temperature of the beverage cools such that the temperature of the beverage in the main beverage chamber 66 is reduced to a temperature below the melting temperature of PCM 74, as the beverage is dispensed an flows through the conditioning channel, the PCM 74 releases (i.e., rejects) the stored thermal energy (i.e., the heat) back into beverage to heat the beverage and dispense the beverage at or near the melting temperature of the PCM 74, and therefore within the desired drinking temperature range. That is, the heat stored in the PCM 74 is rejected to and absorbed by the beverage as it flows through the conditioning channel 62, thereby quickly heating the beverage to within the particular desired drinking temperature range. In this way, a hot beverage disposed within the beverage reservoir 42 can be dispensed having a temperature within the desired drinking temperature range (e.g., a temperature within the range of approximately 53° C./127° F. to 55° C./136° F.), for many hours (e.g., approximately 1 to 24 hours).

Similarly, in various other embodiments, the heat exchanging liquid container system 10 can be configured, via selection of the PCM 74, to allow a person who desires to drink a cold or cool liquid (e.g., a cold or cool consumable beverage) within a desired drinking temperature range (e.g., approximately 1° C./34° F. to 12° C./54° F.) to pour a beverage that has a temperature higher than an upper limit of a desired drinking temperature range (e.g., higher than 6° C./43° F.) into the beverage reservoir 42 of the system 10, whereafter the liquid can be consumed substantially instantly at a temperature within the desired drinking temperature range (1° C./33° F. to 13° C./54° F.). More particularly, in such instances the PCM 74 is selected to have a melting temperature within the desired temperature range (e.g., a melting temperature of 4° C./39° F.), and prior to use, the container system 10 is stored in a refrigerated or cold environment (e.g., an electric freezer or a cooler filled with ice) having a temperature below the PCM melting temperature (e.g., below 4° C./39° F.) such that the PCM 74 obtains its melting temperature (e.g., below 4° C./39° F.) and is converted to its solid state. Subsequently, when the container system is to used it is removed from the refrigerated or cold environment whereafter a beverage having a temperature greater than the melting temperature of the PCM 74 (e.g., greater than the desired drinking temperature) can be poured into the beverage reservoir 42. Substantially immediately, or within a very short time (e.g., 1-30 seconds) thereafter the beverage can be dispensed from the main beverage retention chamber 66 via the conditioning channel 62 whereby as the beverage flows through temperature conditioning channel 62 heat is extracted from beverage by a PCM 74 substantially instantly reducing the beverage temperature to a temperature substantially equal to the PCM melting temperature. It is envisioned that in such cooling embodiments, the container system 10 can be utilized to cool beverages to approximately the desired temperature for several hours (e.g., 1.0 to 24 hours) depending on the ambient environment temperature, and that contain system 10 can be refilled several time with a single charging of the container system 10 (i.e., cooling the container system until the PCM 74 changes to its solid phase).

The outer diameter OD of the beverage dispensing partition 46 is selected to have a length, relative to an inner diameter ID of the PCM liner 18 such that the temperature conditioning channel 62 with have the width D that is select to regulate or control the volume and flow rate of beverage flowing through the conditioning channel 62 and allowed to be dispensed, and thereby regulate or control the rate of thermal energy exchange between the beverage and the PCM 74. As one skilled in the art will readily understand, the smaller the volume of beverage in thermal contact with the PCM 74 (i.e., the smaller the width D of the conditioning channel 62) the higher the rate of thermal energy exchange between the beverage and the PCM 74, and more specifically, the faster the temperature of beverage will be conditioned, or adjusted, to approximate the melting temperature of the PCM 74. In various embodiments, only the PCM liner sidewall 34 is structured and formed to define the PCM cavity, such that only the PCM liner sidewall 34 is fillable with the PCM 74. While in other embodiments, the PCM liner sidewall 34 and bottom 38 are structured and formed to define the PCM cavity 70 and are fillable with the PCM 74.

Additionally, in various embodiments, the main body 14 can be a hollow body structured and formed to include an interior hollow space that defines an insulation cavity 78 that can be at least partially filled with thermal insulation. The thermal insulation can be any suitable thermal insulation, for example, in various embodiments the insulation cavity 78 can be at least partially filled with any desired thermal insulating material, gas or liquid, or can be absent a material, gas or liquid. For example, in various instances, the insulation cavity 78 can be absent or void of air, or mostly absent or void of air (e.g., a vacuum or reduced air), or in other instances the insulation cavity 78 can be at least partially filled with fiberglass, polystyrene, polyurethane foam, cellulose, mineral wool, or any other presently and future known thermal insulation material. The thermal insulating function provided by the thermal insulation within insulation cavity 78 will reduce and retard the rejection of thermal energy (e.g., heat loss) from the PCM 74 to the ambient environment such that the PCM will remain at its respective phase change temperature (also referred to herein as the melting temperature) for an extended period of time.

Similarly, in various embodiments, the dispensing partition 46 can be a hollow body structured and formed to include an interior hollow space that defines an insulation cavity 82 that can be at least partially filled with thermal insulation. The thermal insulation can be any suitable thermal insulation, for example, in various embodiments the insulation cavity 82 can be at least partially filled with any desired thermal insulating material, gas or liquid, or can be absent a material, gas or liquid. For example, in various instances, the insulation cavity 82 can be absent or void of air, or mostly absent or void of air (e.g., a vacuum or reduced air), or in other instances the insulation cavity 82 can be at least partially filled with fiberglass, polystyrene, polyurethane foam, cellulose, mineral wool, or any other presently and future known thermal insulation material. The dispensing partition 46 and the thermal insulating within the 82 provide a barrier between the beverage within the retention chamber 66 and the beverage within the conditioning channel 62 and the PCM 74 within the PCM liner sidewall 34, and thereby significantly reduce or substantially prevent the rejection of thermal energy from the beverage within the retention chamber 66 to the beverage within the conditioning channel 62 and to the PCM 74 within the PCM liner sidewall 34. Therefore, the temperature of the beverage within the retention chamber 66 will be maintained at or near its initial temperature and the decrease of the temperature within the retention chamber 66 will be retarded for an extended period of time (e.g., 1-12 hours).

In operation, when the container system 10 is tilted, or more particularly when a suction is applied to the dispensing opening 58 to dispense or draw the beverage from the container system 10, a beverage flow F is generated through the conditioning channel 62. Accordingly, the beverage flow F will flow from within the retention chamber 66, through the conditioning channel 62 thermally contacting the PCM 74 and exit the conditioning channel 62 at an egress end 62A which is fluidly connected to the lid dispensing opening 58. As one skilled in the art will readily understand, when the beverage flows through the conditioning channel 62 the beverage thermally contacts the PCM 74 within the PCM liner 18. More particularly, when the beverage is at a temperature that is greater than the melting temperature of the PCM 74, as the beverage flows through the conditioning channel 62 thermal energy is transferred from the beverage to the PCM 74 (i.e., the PCM 74 absorbs thermal energy (heat) from the beverage), thereby cooling the beverage to a temperature within the desired temperature range (e.g., a temperature approximate the melting temperature of the PCM 74). The PCM 74 stores the absorbed thermal energy and conversely, after the temperature of the beverage within the retention chamber 66 cools to a temperature that is lower than the melting temperature of the PCM 74, as the beverage flows through the conditioning channel 62 thermal energy stored in the PCM 74 is transferred from the PCM 74 to the beverage (i.e., the PCM 74 rejects the stored thermal energy (heat) and the beverage absorbs the stored thermal energy (heat) from the PCM 74, thereby heating the beverage to a temperature within the desired temperature range. In this way, when the beverage exits the conditioning channel 62, the beverage will have a temperature within the desired drinking temperature range (e.g., approximately 53° C./127° F. to 55° C./136° F. for hot liquids, and 1° C./33° F. to 6° C./42° F. for cold liquids).

As one skilled in the art will readily understand that, due to the volume of the beverage within retention chamber 66 and the barrier provided by the dispensing partition 46, when the system 10 is in an upright orientation (i.e., the beverage is not being dispensed and not flowing through the conditioning channel 62) the thermal energy exchange rate between the beverage and the PCM 74 within the PCM liner bottom 38 (e.g., the rate of absorption of heat by the PCM 74) will be considerably slower than the thermal energy exchange rate between the beverage flowing through the conditioning channel 62 and the PCM 74 within the PCM liner sidewall 34 when the beverage is flowing through the conditioning channel and being dispensed. More specifically, when a suction is applied to the dispensing opening 58 and/or the container is tilted to dispense the beverage, the beverage will begin to flow through the conditioning channel 62 and along the sidewall 34 of the PCM liner 18, thereby thermally contacting the PCM 74 within the PCM liner 18. However, as described above, the width D of the conditioning channel 62 will regulate the volume and flow rate of beverage allowed to be dispensed, and thereby regulate the rate of thermal energy exchange between the beverage and the PCM 74. Hence, the temperature of the beverage flowing through the conditioning channel 62 as it is being dispensed will be conditioned, or adjusted, to be within the desired drinking temperature range much faster than when the beverage is static within the reservoir 42 and not being dispensed. (i.e., not flowing through the conditioning channel 62).

As described above, the dispensing partition 46 is spaced a distance D from the PCM liner 18, thereby defining the beverage temperature conditioning channel 62 having the predetermined width of D. More particularly, the channel width D and length L are computationally predetermined using advanced heat transfer modeling, and verified by the experimental data, to ensure that the beverage will be dispensed through the dispensing opening 58 in the lid 50 at approximately the desired drinking temperature. More specifically, the channel width D and length L are computationally predetermined using advanced heat transfer modeling, and verified by the experimental data, to produce a volume and flow rate of the beverage flow F through the conditioning channel 62 that will allow the necessary thermal exchanger between the beverage flow F and the PCM 74 within the PCM liner sidewall 34 to ensure the beverage is dispensed at a temperature within the desired drinking range. In various exemplary embodiments, the width D of the conditioning channel 62 can be between 0.5 mm and 2.0 mm, e.g., 0.9 mm.

The PCM 74 properties are also accurately predetermined by advanced heat transfer modeling and experimental investigation to accurately control the temperature of the beverage being dispensed. As described above, initially, after the beverage is poured into the container system 10, when the beverage flows through the conditioning channel 62 and contacts the PCM liner sidewall 34, thermal energy is transferred from the beverage to the PCM 74, whereby the PCM 74 changes phase from solid to liquid to store the thermal energy. Using different PCMs 74 with different phase change temperatures (i.e., melting temperatures), the container system 10 can be configured to dispense a beverage at different dinking temperatures. For example, if one person likes to drink coffee at 63° C./145° F., a corresponding PCM 74 and/or channel width D and/or channel length L will be implemented such that a beverage poured into the container system 10 at a temperature higher than 63° C./145° F. will be dispensed at approximately 63° C./145° F. However, if another person likes to drink coffee at 55° C./131° F., a different PCM 74 and/or channel width D and/or channel length L will be implemented such that a beverage poured into the container system 10 at a temperature higher than 55° C./131° F. will be dispensed at approximately 55° C./131° F.

As described above, the lid 50 and the dispensing partition 46 are structured such that seal is formed between the partition proximal end 46B and an underside of the lid central body 50A that blocks the beverage from flowing around the partition proximal end 46B and force the beverage to flow through the beverage conditioning channel 62. As one skilled in the art would readily understand, because only the beverage ingress opening 54 allows for air to enter the main retention chamber 66, and only the dispensing opening 58 allows for the beverage to exit as the beverage is being dispensed, a closed interconnected path is formed between the ingress opening 54 and the dispensing opening 58. Hence, when a consumer draws on (e.g., applies a suction to) the lid 50 at the dispensing opening 62, a negative pressure is produced within the conditioning channels (similar to drawing on a straw inserted into beverage filled glass).

Figure 2A:
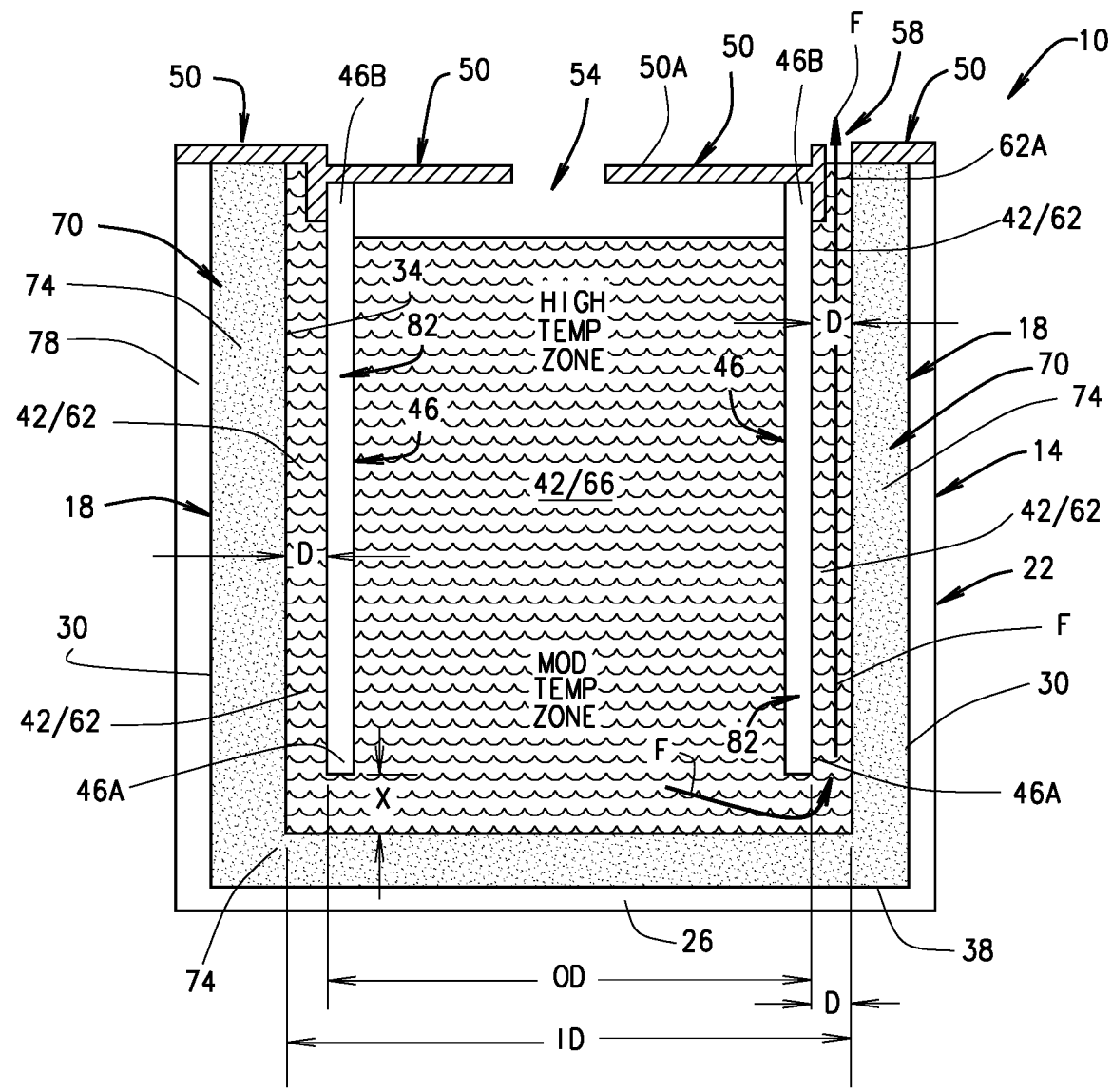
FIG. 2B is a block diagram of the thermal liquid container system shown in FIG. 1 exemplarily illustrating the liquid being dispensed therefrom when the liquid reservoir of the container is approximately half filled with the liquid, in accordance with various embodiments of the present disclosure.
FIG. 2C is block diagram of the thermal liquid container system shown in FIG. 1 exemplarily illustrating the liquid being dispensed therefrom when the liquid reservoir of the container is approximately one quarter filled with the liquid, in accordance with various embodiments of the present disclosure.
Figure 2B:
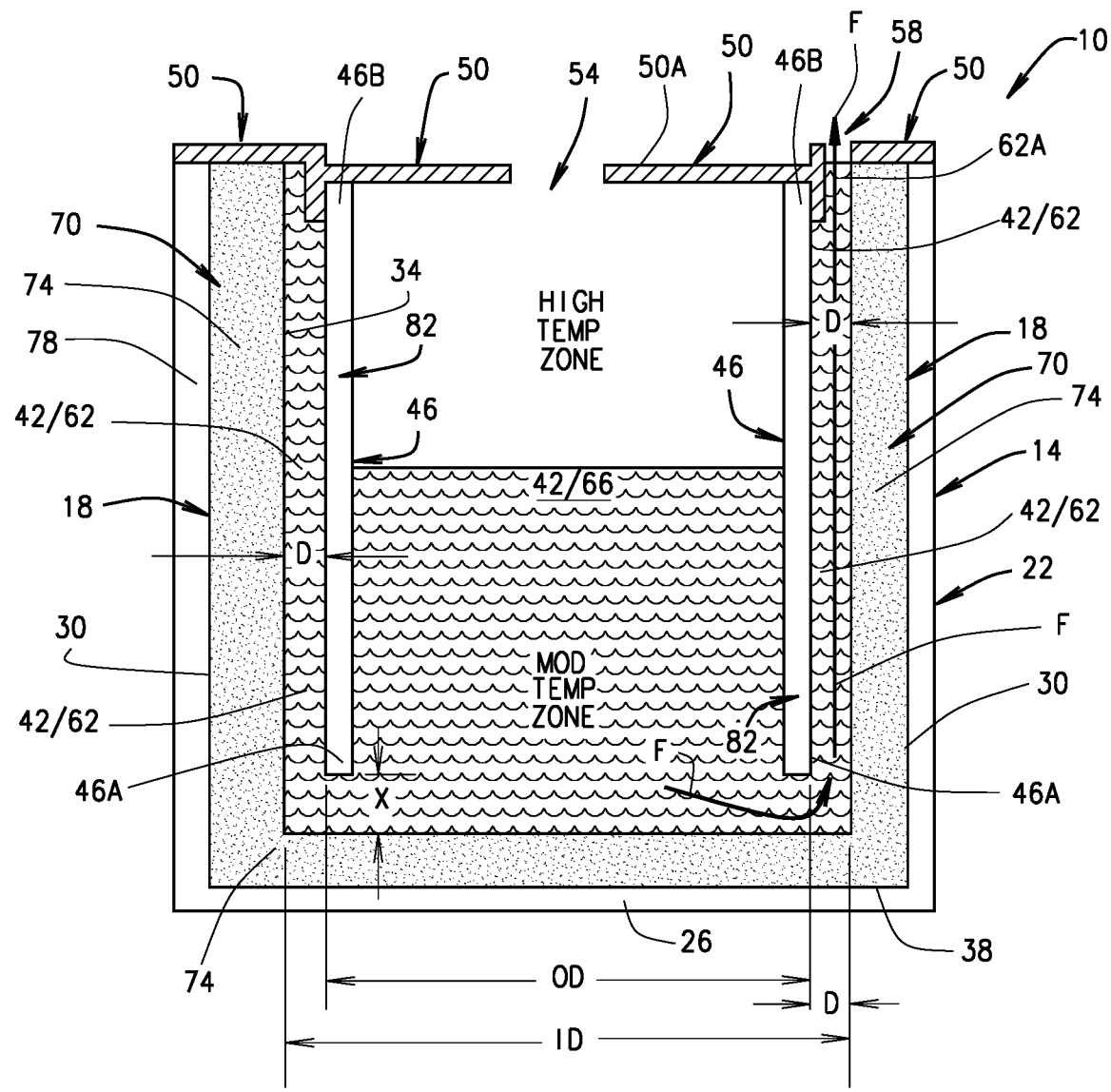
Figure 2C:
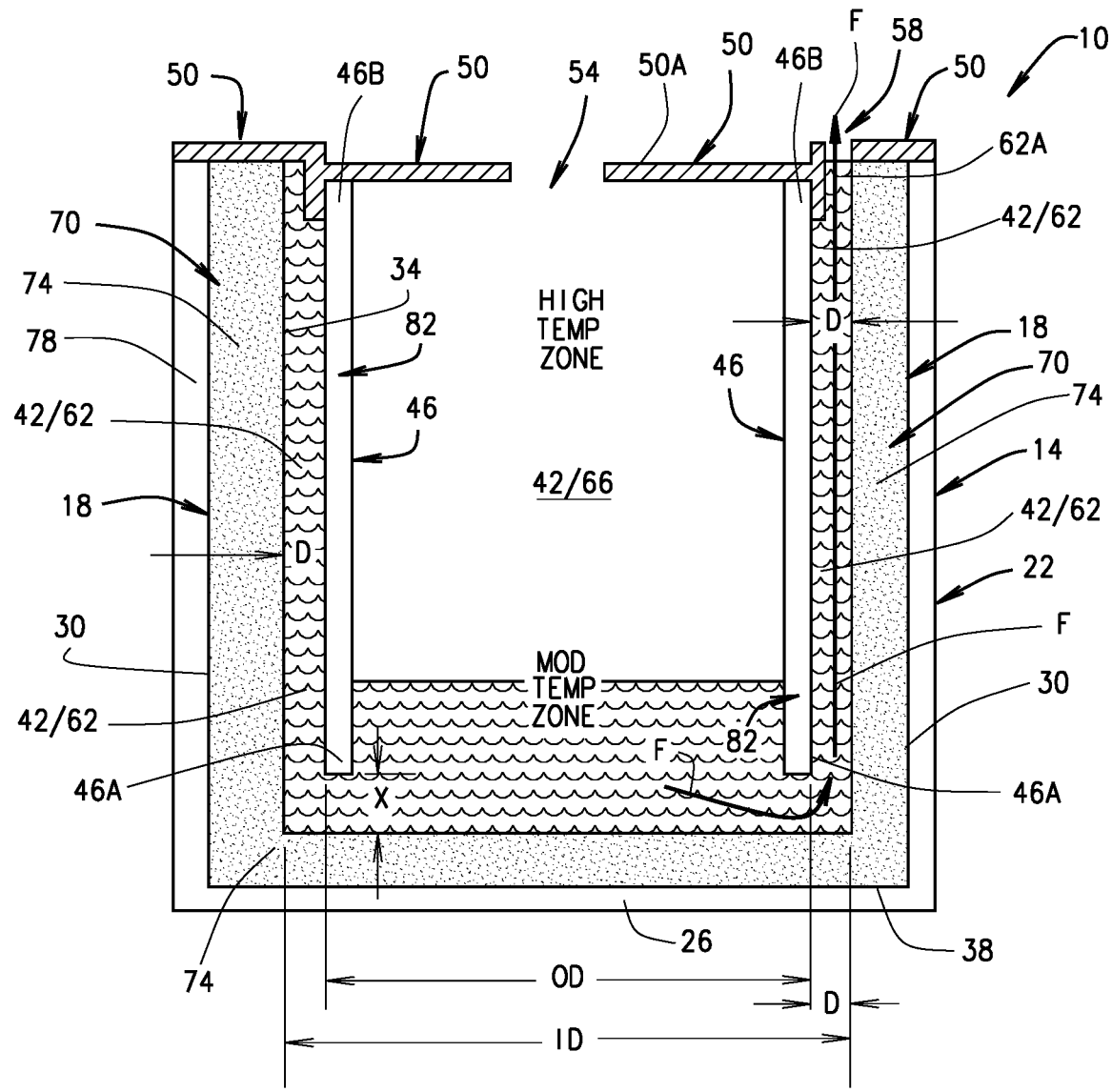

Moreover, when a consumer draws on the dispensing opening 58 the volume of the beverage in the entire conditioning channel 62 increases substantially uniformly (e.g., the level of the beverage in the entire conditioning channel 62 rises uniformly) due to the hydrostatic pressure difference, regardless of the level of the beverage within the main retention chamber 66, as exemplarily illustrated in FIGS. 2A through 2C. Therefore, when a consumer draws on the dispensing opening 58 the beverage will fill the entire conditioning channel 62 and will contact substantially the entire inner surface of the PCM liner sidewall 34 as the beverage is being drawn out the dispensing opening 58. Hence, the entire volume of the beverage filling the entire conditioning channel 62 will thermally exchange heat with the PCM 74 within the PCM liner 18, thereby significantly increasing the heat transfer rate and conditioning the beverage temperature to the desired drinking temperature substantially instantly.

As described above, in various instances, the container system 10 can be used dispense cold beverages at a desired drinking temperature (e.g., 1° C./34° F. to 6° C./43° F.). In such instances, the PCM 74 must be selected to have a melting temperature equivalent to the desired drinking temperature, and PCM 74 must be transitioned to its solid state. This can be done either by placing container system 10 in a refrigerated or cold environment having a temperature below the PCM melting temperature such that the PCM 74 obtains its melting temperature and is converted to its solid state. For example, the container system 10 can be cooled (e.g., frozen) by placing it in an electric freezer, or in a cooler full of ice, or using a thermal electric cooling device, or any other suitable means for cooling the PCM 74 to its respective melting temperature. Once the PCM 74 is cooled to its melting temperature (i.e., the PCM 74 is converted to its solid phase) one can pour a beverage at any temperature above PCM 74 melting temperature (e.g., room temperature or higher) and can immediately be dispensed via the conditioning channel 62 and dispensing opening 58 at the desired drinking temperature.

For example, if the PCM 74 is water, the container system 10 can be placed in an electric freezer until the PCM 74 (water) in the PCM liner 18 changes phase from liquid (water) to solid (ice). Thereafter, the container system 10 can be removed from the freezer, and a beverage (e.g., beer) at room temperature is pour into the beverage reservoir 42 via the ingress opening 54 in the lid 50. Subsequently, when a consumer draws on the lid at the dispensing opening 58, and/or tilts the container system 10, the beverage at room temperature starts to flow from the bottom portion of the main retention chamber 66, through the conditioning channel 62. As the beverage flows through the conditioning channel 62 the PCM 74 will absorb heat from the beverage and very quickly cool the beverage such that beverage is dispensed out the dispensing opening 58 at substantially the desired drinking temperature. Because the PCM 74 in PCM liner 18 is thermally protected by both insulated main body 14 and the insulated beverage dispensing partition the PCM 74 can remain in its solid state, at its melting temperature for many hours.

As described above, the PCM 74 is selected, via advanced heat transfer modeling and experimental investigation, to have a melting temperature corresponding to a desired drinking temperature. For example, if a desired drinking temperature for a particular beverage is 4° C./39° F. (or 55° C./131° F. for a hot beverage), a corresponding PCM 74 will be selected that has a melting temperature of 4° C./39° F. (or 55° C./131° F. for a hot beverage). Similarly, if a desired drinking temperature for a particular beverage is 2° C./35° F. (or 58° C./136° F. for a hot beverage), a corresponding PCM 74 will be selected that has a melting temperature of 2° C./35° F. (or 58° C./136° F. for a hot beverage).

In various embodiments wherein the PCM liner 18 includes the bottom 38, one skilled in the art will readily recognize that when a beverage is disposed within the beverage reservoir 42 a lower portion of the beverage (identified as the modified temperature zone in FIG. 1) will contact the PCM liner bottom 38 and thermally exchange heat with the PCM 72 therewithin, thereby modifying (e.g., reducing) the temperature of the beverage in the modified temperature zone. Hence, there will be a difference in the temperature between the beverage in the modified temperature zone and the beverage with the upper portion of the beverage in the beverage reservoir 42 (identified as the high temperature zone in FIG. 1). When such a temperature difference exists, the temperature difference can produce a difference in density and buoyancy forces between the beverage in the modified temperature zone and the beverage in the high temperature zone. When a beverage is poured into the container system 10, this difference in density and buoyancy forces between the beverage in the high temperature zone and the beverage in modified temperature zone, in various instances, will prevent natural convection mixing of the beverage in the modified temperature zone with the beverage in the high temperature zone.

For example, for a given beverage, if the temperature of the beverage in modified temperature zone is higher than that in the high temperature zone, the density of the beverage in the modified temperature zone is lower than that in the high temperature zone. Therefore, the density difference and the resulting difference in buoyancy forces result in mixing of the beverage in modified temperature zone with that in the high temperature zone, via the natural convection. However, if the temperature of the beverage in the modified temperature zone is lower than that in the high temperature zone, the density of the beverage in the modified temperature zone is higher than that in the high temperature zone. Therefore, the density difference and the resulting difference in buoyancy forces do not result in mixing of the beverage in modified temperature zone with that in the high temperature zone, via the natural convection. Therefore, the hot beverage in the high temperature zone will generally retain its original temperature for a longer time and not mix, via natural convection mixing, the cooler temperature beverage in the modified temperature zone.

It is important to recognize that, as described above, the PCM liner 18 is disposed between the insulation filed main body and the insulation filled beverage dispensing partition 46. Hence, the PCM 74 disposed within the PCM liner is well insulated. For example, if the hot liquid is poured into the beverage reservoir 42, heat rejection from the beverage to the PCM liner sidewall 34 is significantly minimized due to the insulation filed beverage dispensing partition 46. In this way, the temperature of the beverage with in the beverage reservoir 42, i.e., within the main retention chamber 66, is well insulated and the heat transfer rate from beverage to the PCM 74 within the sidewall 34 of the PCM liner 18 is significantly minimized. Additionally, the insulated main body 14 disposed around the PCM line 18 provides insulation between the PCM 74 within the PCM liner 18 and the ambient environment, which significantly minimized the heat transfer between the ambient environment and the PCM 74. Accordingly, the structure of the container system 10 can ensure that when a beverage flows through the conditioning channel 62, the beverage can be dispensed substantially immediately at a desired drinking temperature.

Referring now to FIG. 4, in various embodiments, the container system 10 can further comprise a steeping basket 86 for steeping such things a tea and coffee or any other dried or ground matter used to make a beverage. The steeping basket 86 is disposable (fixedly or removably) within the main beverage retention chamber 66 and generally comprises one or more sidewall 90, a mesh or filter or other type of sieve bottom 94 connected to a distal end of the sidewall 90 and a top lip 102 disposed around and extending from a proximal end of the sidewall 90. The lip 102 is structured and operable to support or hang the steeping basket 86 from the proximal end 46B of the beverage dispensing partition 46 such that the sidewall 94 and mesh bottom 94 are suspended within the main beverage retention chamber 66. More particularly, the lip 102 is structured to be disposed between the dispensing partition proximal 46B of the beverage dispensing partition 46 and the underside of the lid central body 50A and to form a seal. Importantly, when the lid 50 it is properly disposed on and secured to the main body 14 and/or the PCM liner 18 the lid central body 50A, the steeping basket top lip 102, and the proximal end 46B of the dispensing partition 46 form a seal therebetween such that the only flow path for the beverage to be dispensed through the beverage dispensing opening 58 is for the beverage to flow around the dispensing partition distal end 46A, through the conditioning channel 62 and out the dispensing opening 58 in the lid 50, as described in detail below.

In use, a dried or ground matter such as tea or coffee can be placed in the steeping basket 86 and the steeping basket placed into the main retention chamber 66. Thereafter, hot water can be poured into the beverage reservoir 42 such that the hot water is poured over the a dried or ground matter, flows over, across and through the a dried or ground matter and through the sieve bottom 94, thereby filling the beverage reservoir 42 with hot water will turn to a beverage (e.g., tea or coffee) as the a dried or ground matter steeps in the hot water. Subsequently, the beverage can be dispensed through the conditioning channel 62 and dispensing opening 58 at a temperature within the desired temperature range as described above.

Referring now to FIGS. 5A and 5B in various embodiments the container system 10 can comprise one or more heat sink 106 disposed within the PCM cavity 70 of the PCM liner 18. The heat sink(s) 106 are mounted to or connected to the inner wall 18A and provide a thermally conductive conduit from the inner wall 18A into the interior of the PCM liner 18 and into the PCM 74, thereby increasing the heat transfer rate from the beverage flowing through the conditioning channel 62 and the PCM 74. In various instances the heat sink(s) 106 fins fabricated from a high thermally conductive metal, e.g., aluminum or copper, that are disposed longitudinally, as exemplarily shown in FIG. 5A, and/or laterally, as exemplarily shown in FIG. 5B, within the PCM cavity 70. In various other instances the heat sink(s) can have a folded fin configuration such as that exemplarily illustrated in FIG. 5C. Furthermore, it is envisioned that in various embodiments the heat sink(s) 106 can comprise heat pipes, e.g., oscillating heat pipe, that transfer heat from one location to another location, and/or distribute heat throughout a plane (e.g., throughout a heat sink fin) very quickly and efficiently.

Referring now to FIGS. 6 and 7 in various embodiments the container system 10 can have a PCM liner 118 dispose only in the bottom of the receptacle 42, wherein the PCM liner 118 comprises a PCM cavity 170 at least partially filled with a PCM 174. In such embodiments, beverage dispensing partition 46 can comprise a sidewall 46C and an annular bottom 46D extending from the distal end of the partition sidewall 46C, such that the beverage temperature condition channel 62 has an 'L' shape and passes beneath the annular bottom 46D and along the sidewall 46C. More particularly, the conditioning channel 62 is formed between the partition annular bottom 46D and the PCM liner 118, and between the partition sidewall 46C and the main body sidewall 22, as shown in FIGS. 6 and 7. In such embodiments, when a hot beverage flows through the beverage ingress opening 54 into the beverage reservoir 42, the thermal energy can be exchanged between the hot beverage and the PCM 74 as the beverage flows through the conditioning channel 62, thereby dispensing the beverage at a temperature within a desired temperature range.

In various embodiments, the 'L' shaped dispensing partition 46 can be a hollow body structured and formed to include an interior hollow space that defines an insulation cavity 182 that can be at least partially filled with thermal insulation. The thermal insulation can be any suitable thermal insulation, for example, in various embodiments the insulation cavity 182 can be at least partially filled with any desired thermal insulating material, gas or liquid, or can be absent a material, gas or liquid. For example, in various instances, the insulation cavity 182 can be absent or void of air, or mostly absent or void of air (e.g., a vacuum or reduced air), or in other instances the insulation cavity 82 can be at least partially filled with fiberglass, polystyrene, polyurethane foam, cellulose, mineral wool, or any other presently and future known thermal insulation material. The dispensing partition 46 and the thermal insulating within the 182 provide a barrier between the beverage within the retention chamber 66 and the beverage within the conditioning channel 62 and the PCM 174 within the PCM liner 118, and thereby significantly reduce or substantially prevent the rejection of thermal energy from the beverage within the retention chamber 66 to the beverage within the conditioning channel 62 and to the PCM 174 within the PCM liner 118. Therefore, the temperature of the beverage within the retention chamber 66 will be maintained at or near its initial temperature and the decrease of the temperature within the retention chamber 66 will be retarded for an extended period of time (e.g., 1-12 hours).

Alternatively, as exemplarily shown in FIG. 7, in various embodiments, the 'L' shaped dispensing partition can be a solid wall, as opposed to the hollow insulated partition exemplarily shown in FIG. 6. In such instances the beverage would pass through the conditioning channel 62, as described above, such that the beverage is dispensed at a temperature within a desired temperature range.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A thermal liquid container system for dispensing a liquid from the system at a temperature within a desired temperature range, said system comprising:
    a main body;
    a phase change material (PCM) liner disposed within the main body having a PCM disposed therein, the PCM having a selected melting temperature;
    a liquid reservoir defined by PCM liner, the liquid reservoir structured and operable to have a liquid disposed therein having a first temperature;
    a liquid dispensing partition disposed within the liquid reservoir such that the liquid reservoir is partitioned into a temperature conditioning channel formed between the PCM liner and the beverage dispensing partition, and a liquid retention chamber defined by the liquid dispensing partition; and
    a lid comprising a liquid ingress opening formed within a central body of the lid and a liquid dispensing opening formed within a lip of the lid, the lid connectable to at least one of the main body and the PCM liner such that a seal is formed between the central body and a proximal end of the PCM liner such that in order for a liquid within the liquid reservoir to be dispensed through the liquid dispensing opening, the liquid must flow through the temperature conditioning channel, wherein
    the temperature conditioning channel is structured and operable place the liquid passing therethrough in thermal contact with the PCM whereby thermal energy is exchanged between the liquid flowing through the temperature conditioning channel and the PCM such that the liquid is dispensed through the liquid dispensing opening at a second temperature that is within a desired temperature range determined by the selected PCM melting temperature, the second temperature being different than the first temperature.

2. The system of claim 1, wherein the liquid dispensing partition comprises a partition insulation cavity at least partially filled with thermal insulation such that the liquid dispensing partition reduces the rejection of thermal energy from liquid within the retention chamber to liquid within the conditioning channel.

3. The system of claim 1, wherein the main body comprises a main body insulation cavity that is at least partially filled with thermal insulation such that the main body reduces the rejection of thermal energy from the PCM to an ambient environment.

4. The system of claim 3, wherein the liquid dispensing partition comprises a partition insulation cavity at least partially filled with thermal insulation such that the liquid dispensing partition reduces the rejection of thermal energy from liquid within the retention chamber to liquid within the conditioning channel.

5. The system of claim 1, wherein the conditioning channel has a predetermined width that is structured and operable to regulate a volume and a flow rate of liquid flowing through the conditioning channel, thereby regulating the rate of thermal energy exchange between the liquid and the PCM.

6. The system of claim 1 further comprising at least one heat sink disposed within the PCM liner, the at least one heat sink structured and operable to increase a rate of the thermal energy exchange between the PCM and the liquid as the liquid flows through the temperature conditioning channel when being dispensed from the liquid reservoir.

7. The system of claim 6 wherein the at least one heat sink comprises a heat pipe.

8. The system of claim 1, wherein the liquid is hot water, and the system further comprises a steeping basket disposable within the liquid retention chamber, the steeping basket structured and operable to retain at least one of dried or ground matter to be steeped by the hot water.

9. A thermal liquid container system for dispensing a liquid from the system at a temperature within a desired temperature range, said system comprising:
  a main body;
  a phase change material (PCM) liner disposed within the main body having a PCM disposed therein, the PCM having a selected melting temperature;
  a liquid reservoir defined by PCM liner, the liquid reservoir structured and operable to have a liquid disposed therein having a first temperature;
  a liquid dispensing partition disposed within the liquid reservoir such that the liquid reservoir is partitioned into a temperature conditioning channel formed between the PCM liner and the beverage dispensing partition, and a liquid retention chamber defined by the liquid dispensing partition, wherein
    the liquid dispensing partition comprises a partition insulation cavity at least partially filled with thermal insulation such that the liquid dispensing partition reduces the rejection of thermal energy from liquid within the retention chamber to liquid within the conditioning channel; and
    the main body comprises a main body insulation cavity that is at least partially filled with thermal insulation such that the main body reduces the rejection of thermal energy from the PCM to an ambient environment; and
  a lid comprising a liquid ingress opening formed within a central body of the lid and a liquid dispensing opening formed within a lip of the lid, the lid connectable to at least one of the main body and the PCM liner such that a seal is formed between the central body and a proximal end of the PCM liner such that in order for a liquid within the liquid reservoir to be dispensed through the liquid dispensing opening, the liquid must flow through the temperature conditioning channel, wherein
  the temperature conditioning channel is structured and operable place the liquid passing therethrough in thermal contact with the PCM whereby thermal energy is exchanged between the liquid flowing through the temperature conditioning channel and the PCM such that the liquid is dispensed through the liquid dispensing opening at a second temperature that is within a desired temperature range determined by the selected PCM melting temperature, the second temperature being different than the first temperature.

10. The system of claim 9, wherein the conditioning channel has a predetermined width that is structured and operable to regulate a volume and a flow rate of liquid flowing through the conditioning channel, thereby regulating the rate of thermal energy exchange between the liquid and the PCM.

11. The system of claim 9 further comprising at least one heat sink disposed within the PCM liner, the at least one heat sink structured and operable to increase a rate of the thermal energy exchange between the PCM and the liquid as the liquid flows through the temperature conditioning channel when being dispensed from the liquid reservoir.

12. The system of claim 11 wherein the at least one heat sink comprises a heat pipe.

13. The system of claim 9, wherein the liquid is hot water, and the system further comprises a steeping basket disposable within the liquid retention chamber, the steeping basket structured and operable to retain at least one of dried or ground matter to be steeped by the hot water.

14. A thermal liquid container system for dispensing a liquid from the system at a temperature within a desired temperature range, said system comprising:
  a main body;
  a phase change material (PCM) liner disposed within the main body having a PCM disposed therein, the PCM having a selected melting temperature;
  a liquid reservoir defined by PCM liner, the liquid reservoir structured and operable to have a liquid disposed therein having a first temperature;
  a liquid dispensing partition disposed within the liquid reservoir such that the liquid reservoir is partitioned into a temperature conditioning channel formed between the PCM liner and the beverage dispensing partition, and a liquid retention chamber defined by the liquid dispensing partition, wherein
    the liquid dispensing partition comprises a partition insulation cavity at least partially filled with thermal insulation such that the liquid dispensing partition reduces the rejection of thermal energy from liquid within the retention chamber to liquid within the conditioning channel; and
    the main body comprises a main body insulation cavity that is at least partially filled with thermal insulation such that the main body reduces the rejection of thermal energy from the PCM to an ambient environment; and
  a lid comprising a liquid ingress opening formed within a central body of the lid and a liquid dispensing opening formed within a lip of the lid, the lid connectable to at least one of the main body and the PCM liner such that a seal is formed between the central body and a proximal end of the PCM liner such that in order for a liquid within the liquid reservoir to be dispensed through the liquid dispensing opening, the liquid must flow through the temperature conditioning channel, wherein
  the temperature conditioning channel is structured and operable place the liquid passing therethrough in thermal contact with the PCM whereby thermal energy is exchanged between the liquid flowing through the temperature conditioning channel and the PCM such that the liquid is dispensed through the liquid dispensing opening at a second temperature that is within a desired temperature range determined by the selected PCM melting temperature, the second temperature being different than the first temperature.

15. The system of claim 14, wherein the conditioning channel has a predetermined width that is structured and operable to regulate a volume and a flow rate of liquid flowing through the conditioning channel, thereby regulating the rate of thermal energy exchange between the liquid and the PCM.

16. The system of claim 15 further comprising at least one heat sink disposed within the PCM liner, the at least one heat sink structured and operable to increase a rate of the thermal energy exchange between the PCM and the liquid as the liquid flows through the temperature conditioning channel when being dispensed from the liquid reservoir.

17. The system of claim 16 wherein the at least one heat sink comprises a heat pipe.

18. The system of claim 16, wherein the liquid is hot water, and the system further comprises a steeping basket disposable within the liquid retention chamber, the steeping basket structured and operable to retain at least one of dried or ground matter to be steeped by the hot water.

\* \* \* \* \*